United States Patent [19]

Rhear

[11] 4,332,188
[45] Jun. 1, 1982

[54] COMBINATION COOKER

[76] Inventor: Frances Y. Rhear, 1102 Lions Park Dr., St. Joseph, Mich. 49085

[21] Appl. No.: 837,736

[22] Filed: Sep. 29, 1977

[51] Int. Cl.³ .................... A47J 37/04; A23L 1/18
[52] U.S. Cl. .................... 99/323.5; 99/340; 99/403; 99/421 H; 99/422; 99/427; 99/446; 99/447
[58] Field of Search .................... 99/340, 323.5, 323.9, 99/323.11, 327, 422, 427, 447, 403, 421 H, 446; 126/25 R

[56] References Cited

U.S. PATENT DOCUMENTS

| | | | |
|---|---|---|---|
| 743,688 | 11/1903 | Butler | 99/447 |
| 771,638 | 10/1904 | Hornby | 99/427 |
| 964,241 | 7/1910 | Gray | 99/427 X |
| 983,549 | 2/1911 | Greiner | 99/427 X |
| 1,292,031 | 1/1919 | Parker | 99/427 X |
| 1,541,472 | 6/1925 | Born | 99/327 |
| 3,330,266 | 7/1967 | Stephen | 126/25 R |
| 3,472,151 | 10/1969 | Cox | 99/340 |
| 3,611,910 | 10/1971 | Hughes | 99/323.5 |

FOREIGN PATENT DOCUMENTS 2215189  6/1974  France ........................ 99/323.5

Primary Examiner—Billy J. Wilhite
Attorney, Agent, or Firm—Oltsch, Knoblock & Hall

[57] ABSTRACT

A combination cooker for popcorn, pizza, shish kebabs, and deep frying which includes a base having a heating element therein supporting a bowl-shaped body. Either a tray or shaft-carried basket is supported by the upper rim of the bowl-shaped body of the cooker over the heating element in the base.

4 Claims, 5 Drawing Figures

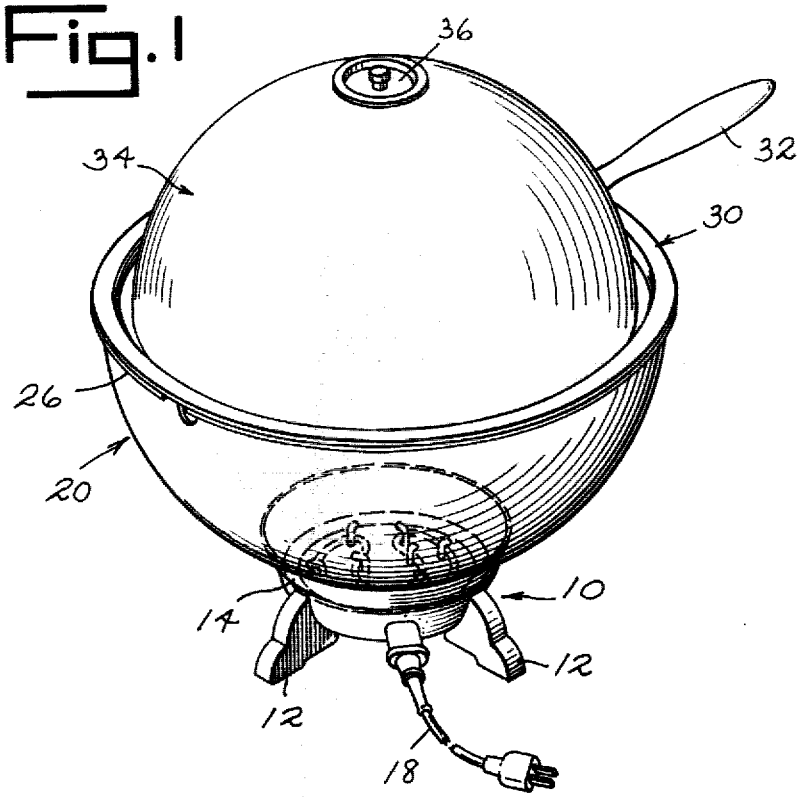
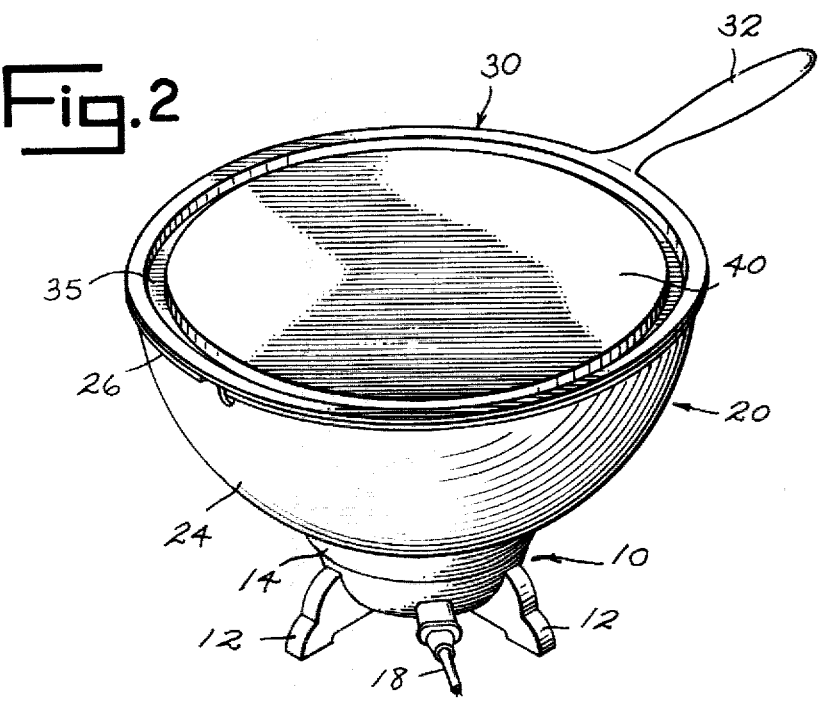

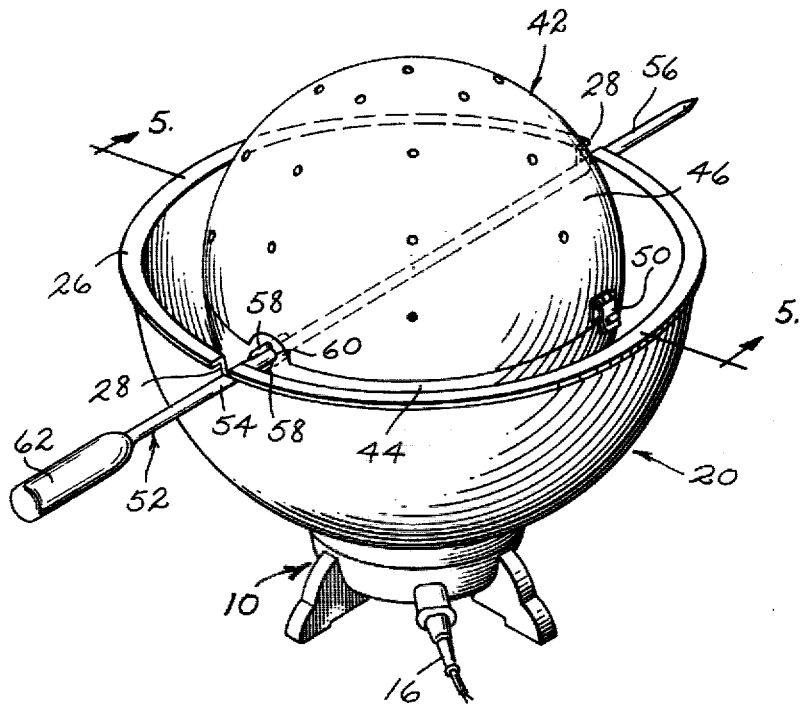
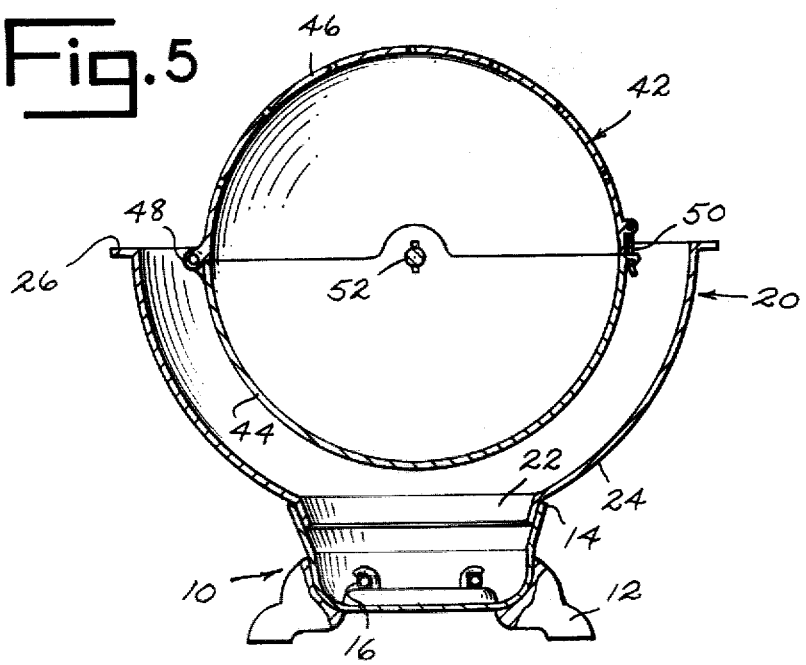

४,३३२,१८८

COMBINATION COOKER

SUMMARY OF INVENTION

This invention relates to a cooker which can be utilized as a pizza baker, popcorn popper, deep fryer and shish kebab skewer.

The cooker of this invention includes a base having a heating element which supports a bowl-shaped body having an opening in its bottom wall and terminating in an upper annular rim. The opening in the bowl-shaped body overlies the heating element in the base. Either an annular planar tray or shaft-carried basket is supported by the upper rim of the bowl-shaped body. A cover is included to enclose the tray when the tray is supported on the bowl-shaped body, such as when baking pizza. The shaft-supported basket includes an impervious base part and a perforated lid part hinged to the base part. The basket is utilized for popping corn and for deep frying. The shaft which supports the basket upon the rim of the bowl-shaped body of the cooker can be removed from the basket and is pointed at one end to allow food items to be placed upon the shaft for shish kebab type cooking.

The cooker, as briefly above described, is of compact construction and allows a variety of different types of food items to be cooked with a minimum of equipment and need for space. This cooker would have application in small apartments as well as college dormitories, motor homes and travel trailers. Accordingly, it is an object of this invention to provide a compact, economical cooker for pizza.

Another object of this invention is to provide a compact, economical cooker for pizza, popcorn, deep frying and shish kebabs.

Still another object of this invention is to provide a combination cooker for use in small apartments, college dormitories, travel trailers and motor homes.

Other objects of this invention become apparent upon reading of the invention's description.

BRIEF DESCRIPTION OF THE DRAWINGS

A preferred embodiment of this invention has been chosen for the purpose of illustration and description wherein:

FIG. 1 is a perspective view of the cooker supporting a tray component having a cover positioned over the tray.

FIG. 2 is a perspective view of the cooker in FIG. 1 showing the cover removed to fully expose the tray.

FIG. 4 is a perspective view of the cooker showing it accommodating a cooking basket.

FIG. 5 is a cross-sectional view of the cooker as seen from line 5—5 in FIG. 4.

DESCRIPTION OF THE PREFERRED EMBODIMENT

Figure 3:
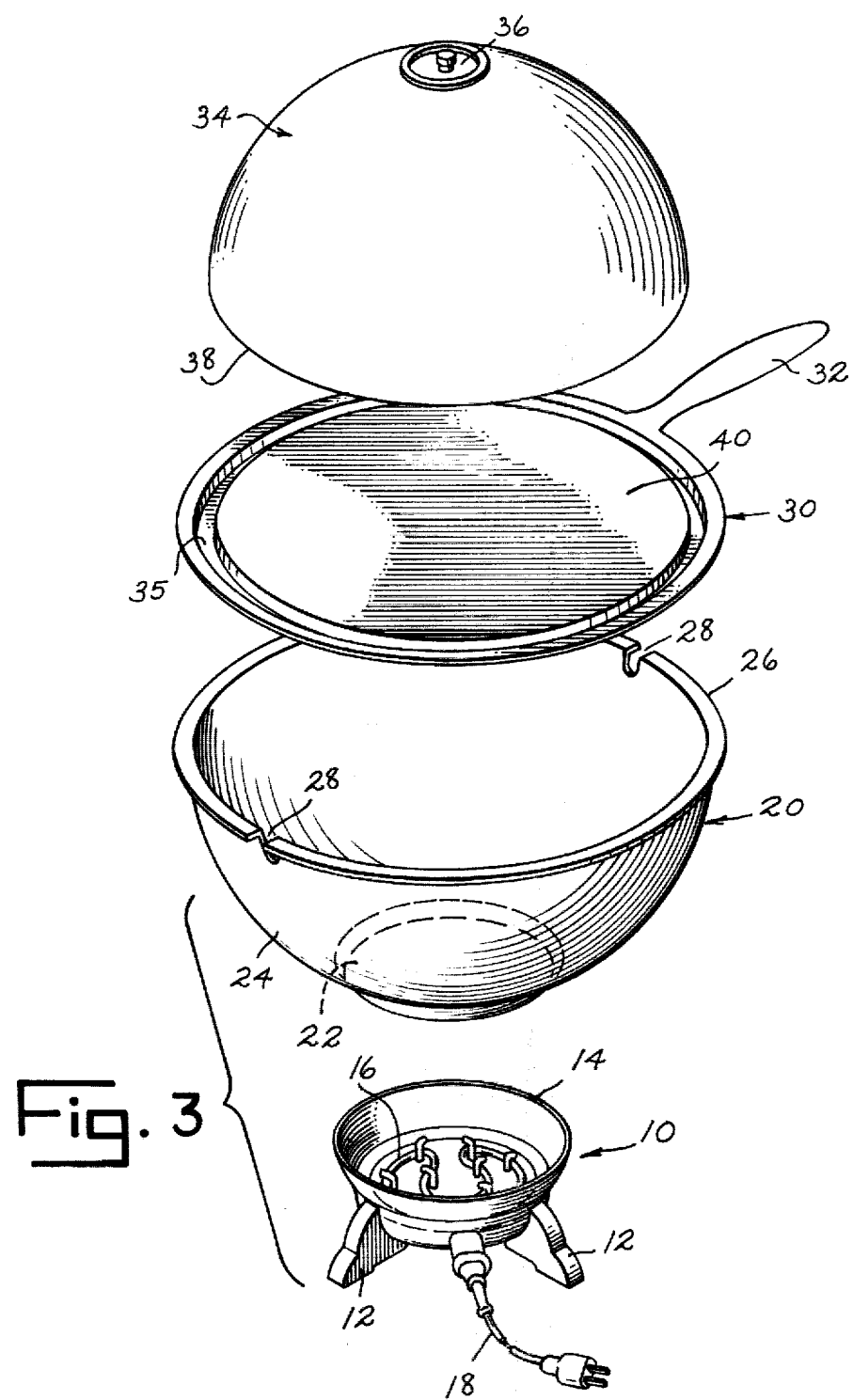
FIG. 3 is a perspective view of the cooker in FIG. 1 showing the component parts thereof in separated form for purposes of illustration.

The preferred embodiment illustrated is not intended to be exhaustive or to limit the invention's precise form disclosed. It is shown and described in order to best explain the principles of the invention and its application and practical use to enable others skilled in the art to best utilize the invention.

The cooker, as shown in FIGS. 1–5, includes a base 10 having feet 12 and including upwardly extending annular rim 14. An electrical heating coil 16 is supported within base 10 below rim 14. An electrical cord 18 extends from heating coil 16 and is adapted for plugged connection into an accommodating electrical outlet. A bowl-shaped body 20 having an opening 22 formed in its lower wall 24 is supported upon base 10 with rim 14 of the base engaging wall 24 of the body about its opening 22. In this manner the interior of body 20 is directly exposed to the heat from heating coil 16. The upper rim 26 of body 20 is formed into an out-turned flange and has diametrically opposed slots 28 formed in it. Body 20 as well as rim 14 of base 10 may be formed of a metallic composition, such as stainless steel, able to withstand the heat of heating coil 16. Feed 12 of base 10 may be formed of insulative material, such as a heat-resistant plastic.

In FIGS. 1–3 the cooker thus far described is shown accommodating a tray 30 which may be either of the solid metal or of a screen sheet construction and which is utilized to support pizza and similar items for cooking purposes. Tray 30 includes a handle 32 which allows it to be placed upon or removed from body 20 of the cooker. In use, tray 30 is placed upon upper rim 26 of body 20. During the cooking process a cover 34 is preferably positioned over tray 30 with the cover being supported by the outer marginal edge of the tray. Cover 34 includes a top vent 36 to allow a selected amount of steam and other vapors to escape from under the cover during the cooking process. The upper surface of tray 30 is interrupted by an annular channel part 35 which is located next to the outer edge of the tray. When tray 30 is supported upon body 20, channel part 35 of the tray protrudes into the interior of the body next to its rim 26 so as to locate and position the tray. Additionally, channel part 35 also receives the lower edge 38 of cover 34 so as to locate and position the cover over the cooking surface 40 of the tray. If tray 30 is formed of a screen material, the screen portion of the tray will be that part located within the circular area bounded by channel part 35. In such screen construction, channel part 35 and the outer edge of the tray will be formed of a solid metal composition to provide support for the screened center of the tray as well as to provide a heat retaining seal between the tray and rim 26 of the body and lower edge 38 of cover 34. Cover 34 is preferably formed of a heat-resistant clear plastic composition to allow the user of the cooker of this invention to view the cooking process.

In FIGS. 4 and 5 the cooker of this invention is shown with tray 30 and cover 34 removed. A basket 42 having an impervious base part 44 and a perforated lid part 46 is shown. Lid part 46 is connected to base part 44 by a detachable hinge 48 and is locked in its closed position over the base part by a releasable latch 50. A shaft 52 extends generally diametrically through basket 42 and includes protruding end portions 54 and 56. Shaft 52 is designed to be removed axially from basket 42. Shaft end portion 54 includes ribs 58 which fit within a complemental opening 60 in basket base part 44 to secure basket 42 for rotation with shaft 52.

Basket 42 is designed to fit within bowl-shaped body 20 with end portions 54 and 56 of shaft 52 being supported within slots 28 of the body at its rim 26. A handle 62 is connected to end portion 54 of shaft 52 to enable the shaft and connected basket 42 to be rotated within body 20 while the shaft is supported within body slots 28. In this cooking mode, basket 42 can be utilized to pop popcorn or, with its lid part 46 removed, it can be utilized as a deep fryer. As indicated in FIG. 5, base part 44 of basket 42 is supported adjacently above heat coil 16 to enable the contents within the basket to be sufficiently heated for cooking purposes.

End portion of 56 of shaft 52 is preferably pointed to enable the shaft to be withdrawn from basket 42 and be utilized separately as a skewer supported within slots 28 of body 20. Alternatively, shaft 52 need only be withdrawn from basket 42 sufficiently far enough to enable its pointed end portion 56 to be located within the interior of the basket. Basket lid part 46 is removed and meat or other food items are placed upon the shaft over end portion 56. Then shaft end portion 56 is reinserted through the side of basket base part 44 and again supported by body 20. In this manner the food items will be supported for skewer-type cooking directly over basket base part 44 which can be utilized to catch the drippings during the cooking operation. In this mode of operation, shaft 52 will be withdrawn sufficiently from basket 42 so as to disengage its ribs 58 from base part 44, thereby enabling the shaft to be rotated with its food items relative to the basket while supported within body slots 28. Basket 42 and shaft 52 are formed of a metal heat resistant material, such as stainless steel.

It is understood that the invention is not to be limited to the details above given but may be modified within the scope of the appended claims.

What I claim is:

1. A combination cooker for popcorn, pizza, shish kebabs, and deep-frying comprising a base having an upwardly extending annular rim supported for positioning upon a table and including a heating element, a bowl-shaped body having an opening in its bottom wall and terminating in an upper annular rim, said body removably seated upon said base within said annular rim thereof with said body opening positioned over said heating element, and angular planar sheet means for supporting food items during cooking, said heat means seated removably upon said body with the rim of said body supporting the sheet means in a generally horizontal plane, said sheet means spanning said body at its rim and overlying said heating element, a removable cover positioned over said sheet means, said cover including a lower angular edge supportingly contacting such sheet means, said body rim having diametrically opposed slots formed therein, basket means for holding food items, said basket means having an impervious base and a perforated top, a shaft extending through said basket means and including opposite ended portions extending from each side of the basket means, said basket means fitting with clearance within said body when said cover and sheet means are removed and having said shaft end portions fitting within said body slots to support said basket means within said body above said heating element.

2. The cooker of claim 1 wherein said shaft engages said basket means base whereby said basket means top may be opened when said basket means is supported by said shaft in said body slots.

3. The cooker of claim 2 wherein said shaft is removable from said basket means for use as a skewer.

4. The cooker of claim 2 wherein said basket means top lid is removably hinged to the base of said basket means.

* * * * *